United States Patent
Zhou

(10) Patent No.: US 9,052,761 B2
(45) Date of Patent: Jun. 9, 2015

(54) METHODS AND DEVICES FOR USER TOUCH OPERATION

(71) Applicant: Huawei Device Co., Ltd., Shenzhen, Guangdong (CN)

(72) Inventor: Yingjun Zhou, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 215 days.

(21) Appl. No.: 13/729,763

(22) Filed: Dec. 28, 2012

(65) Prior Publication Data

US 2013/0120298 A1 May 16, 2013

Related U.S. Application Data

(63) Continuation of application No. PCT/CN2011/080323, filed on Sep. 29, 2011.

(30) Foreign Application Priority Data

Sep. 30, 2010 (CN) .......................... 2010 1 0506145

(51) Int. Cl.
G06F 3/041 (2006.01)
G06F 3/0488 (2013.01)
G06F 3/0484 (2013.01)

(52) U.S. Cl.
CPC .............. *G06F 3/041* (2013.01); *G06F 3/0488* (2013.01); *G06F 3/04842* (2013.01); *G06F 3/0416* (2013.01)

(58) Field of Classification Search
CPC .... G06F 3/041; G06F 3/0416; G06F 3/04842

USPC .......................................................... 345/173
See application file for complete search history.

(56) References Cited

U.S. PATENT DOCUMENTS

2005/0110769 A1  5/2005  DaCosta et al.
2006/0055662 A1  3/2006  Rimas-Ribikauskas et al.
(Continued)

FOREIGN PATENT DOCUMENTS

CN  1172547 A   2/1998
CN  1853751 A   11/2006
(Continued)

OTHER PUBLICATIONS

Extended European Search Report in corresponding European Patent Application No. 11828133.6 (May 24, 2013).
(Continued)

*Primary Examiner* — Jonathan Blancha
(74) *Attorney, Agent, or Firm* — Leydig, Voit & Mayer, Ltd.

(57) ABSTRACT

A user touch operation mode adaptive method and device are provided, so as to solve the problem of incorrect identification of a user touch operation mode due to different user habits. The technical solution includes: receiving a touch action, and obtaining a touch range value of the touch action according to a touch press coordinate and a touch uplift coordinate of the touch action; and comparing the touch range value of the touch action with a range threshold that is set according to user operation habit for discriminating a touch click mode from a touch slide mode, in which if the touch range value is greater than the range threshold, the touch action is in the touch slide mode, and if the touch range value is not greater than the range threshold, the touch action is in the touch click mode.

12 Claims, 7 Drawing Sheets

(56) References Cited

U.S. PATENT DOCUMENTS

| | | |
|---|---|---|
| 2006/0170658 A1* | 8/2006 | Nakamura et al. ............ 345/173 |
| 2006/0227116 A1* | 10/2006 | Zotov et al. ................... 345/173 |
| 2008/0165160 A1 | 7/2008 | Kocienda et al. |
| 2009/0251425 A1 | 10/2009 | Sohn et al. |
| 2009/0315826 A1 | 12/2009 | Lin et al. |
| 2009/0322699 A1 | 12/2009 | Hansson |
| 2010/0073567 A1 | 3/2010 | Lee et al. |
| 2013/0201136 A1* | 8/2013 | Baard et al. ................... 345/173 |

FOREIGN PATENT DOCUMENTS

| | | |
|---|---|---|
| CN | 101364160 A | 2/2009 |
| CN | 101408823 A | 4/2009 |
| CN | 101409733 A | 4/2009 |
| CN | 101446872 A | 6/2009 |
| CN | 101518059 A | 8/2009 |
| CN | 101556516 A | 10/2009 |
| CN | 101630213 A | 1/2010 |
| CN | 101661352 A | 3/2010 |
| CN | 101739191 A | 6/2010 |
| CN | 101963863 A | 2/2011 |
| JP | H11-272421 | 10/1999 |
| JP | 2007082020 A | 3/2007 |
| JP | 2010515980 A | 5/2010 |
| JP | 2010146279 A | 7/2010 |
| KR | 20060051265 A | 5/2006 |
| KR | 20100052372 A | 5/2010 |

OTHER PUBLICATIONS

Written Opinion of the International Searching Authority in corresponding PCT Patent Application No. PCT/CN2011/080323 (Jan. 5, 2012).

International Search Report in corresponding PCT Patent Application No. PCT/CN2011/080323 (Jan. 5, 2012).

1st Office Action in corresponding Chinese Patent Application No. 201010506145.0 (Oct. 26, 2011).

Rejection Decision in corresponding Chinese Patent Application No. 201010506145.0 (Aug. 3, 2012).

* cited by examiner

METHODS AND DEVICES FOR USER TOUCH OPERATION

CROSS-REFERENCE TO RELATED APPLICATIONS

This application is a continuation of International Patent Application No. PCT/CN2011/080323, filed on Sep. 29, 2011, which claims priority to Chinese Patent Application No. 201010506145.0, filed on Sep. 30, 2010, both of which are hereby incorporated by reference in their entireties.

FIELD OF THE INVENTION

The present invention relates to the field of touch screen terminals, and in particular, to a user touch operation mode adaptive method and device.

BACKGROUND OF THE INVENTION

At present, touch screen terminals in the market include, for example, a touch mobile phone, a touch MP3, and a touch notebook. In a touch screen terminal, a user touch operation mode includes a touch slide mode and a touch click mode, the touch slide mode is touch slide of a user on a touch screen, and the touch click mode is touch single-click or touch double-click of a user on a touch screen. After receiving a touch action of a user, a touch screen terminal determines a mode of the touch action according to an intrinsic threshold that is set in the terminal. For example, in a mobile phone event processor of a touch screen mobile phone, 15 pixels are generally used as a threshold for determining the touch click mode and the touch slide mode. If a touch press event is received first, and then a touch slide event is received, and a position shift between a subsequently received touch uplift event and the touch press event is in a fixed 15-pixel range and the touch slide event is also within the 15 pixels, it is determined that the user touch operation mode is the touch click mode, and a user click operation is performed. In contrast, if the position shift is greater than 15 pixels, it is determined that the user touch operation mode is the touch slide mode, and a user slide operation is performed.

In the implementation of the present invention, it is found that incorrect operation easily occurs in identification of the user touch operation mode due to different user habits. For example, some users are accustomed to use a touch pen, and a contact area is small, so that the pixel range used for determination is small, and the operation of the user may be accurately identified if the threshold is 3 pixels; while some users are accustomed to operate with fingers, and a contact area is large, so that the pixel range used for determination is large, and the operation of the user may be accurately identified if the threshold is 15 pixels. Even in some cases, finger sizes of different users are also different, and for some users, the operation of them may be accurately identified if the threshold is 20 pixels. Therefore, incorrect operation easily occurs in identification of the user touch operation mode by using the same determination criterion on different users.

SUMMARY OF THE INVENTION

Embodiments of the present invention provide a user touch operation mode adaptive method and device, so as to solve the problem of incorrect identification of a user touch operation mode due to different user habits.

In order to achieve the foregoing objective, the embodiments of the present invention employ the following technical solutions.

A user touch operation mode adaptive method, applicable to a touch screen terminal, includes: receiving a touch action, and obtaining a touch range value of the touch action according to a touch press coordinate and a touch uplift coordinate of the touch action; and comparing the touch range value of the touch action with a range threshold that is set according to a user operation habit for discriminating a touch click mode from a touch slide mode, in which if the touch range value is greater than the range threshold, the touch action is in the touch slide mode, and if the touch range value is not greater than the range threshold, the touch action is in the touch click mode.

A user touch operation mode adaptive device includes:
a receiving unit, configured to receive a touch action;
a first execution unit, configured to obtain a touch range value of the touch action according to a touch press coordinate and a touch uplift coordinate of the touch action that are received by the receiving unit;
a first comparison unit, configured to compare the touch range value of the touch action obtained by the execution unit with a range threshold that is set according to a user operation habit for discriminating a touch click mode from a touch slide mode; and
a first result unit, configured to determine that the touch action is in the touch slide mode when the touch range value is greater than the range threshold, or determine that the touch action is in the touch click mode when the touch range value is not greater than the range threshold.

A touch screen terminal includes the user touch operation mode adaptive device.

In the user touch operation mode adaptive method and device according to the embodiments of the present invention, whether the touch action is in the touch slide mode or in the touch click mode is determined by comparing the touch range value of the touch action with the range threshold that is set according to the user operation habit for discriminating the touch click mode from the touch slide mode, so as to solve the problem of incorrect operation easily occurring in identification of the user touch operation mode due to different user habits.

DETAILED DESCRIPTION OF THE EMBODIMENTS

The technical solutions of the present invention are clearly and fully described in the following with reference to the accompanying drawings of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

In order to solve the problem of incorrect identification of a user touch operation mode due to different user habits, embodiments of the present invention provide a user touch operation mode adaptive method and device.

Figure 1:
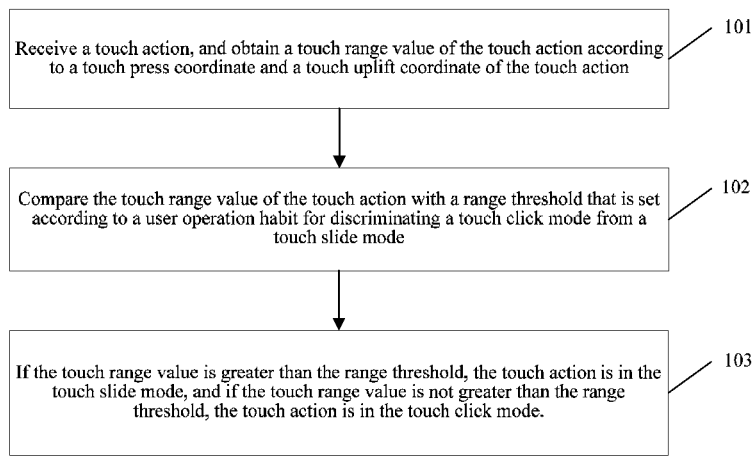
FIG. 1 is a flow chart of a user touch operation mode adaptive method according to an embodiment of the present invention.

As shown in FIG. 1, a user touch operation mode adaptive method according to an embodiment of the present invention includes the following steps.

Step 101: Receive a touch action, and obtain a touch range value of the touch action according to a touch press coordinate and a touch uplift coordinate of the touch action.

Step 102: Compare the touch range value of the touch action with a range threshold that is set according to a user operation habit for discriminating a touch click mode from a touch slide mode.

Figure 2:
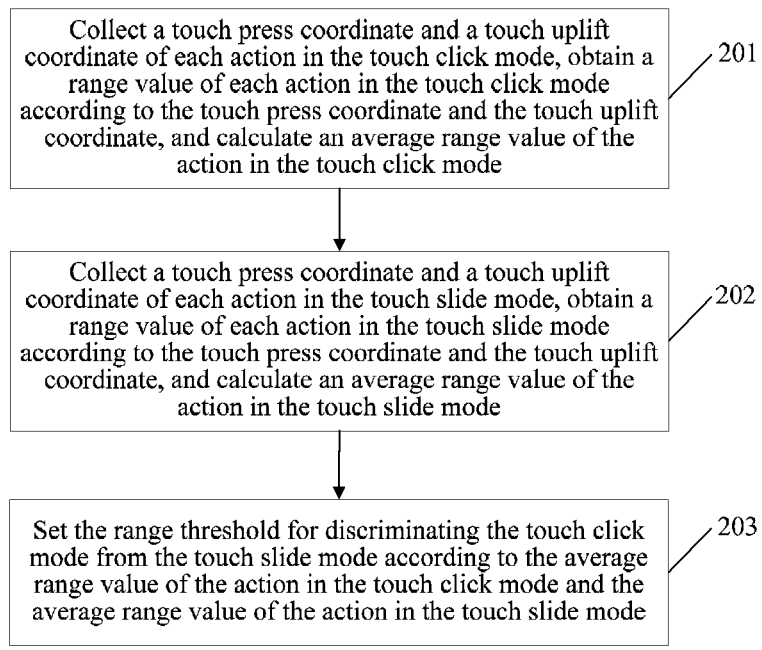
FIG. 2 shows a method of setting a range threshold, according to a user operation habit, for discriminating a touch click mode from a touch slide mode in FIG. 1.

The range threshold that is set according to a user operation habit for discriminating the touch click mode from the touch slide mode may be obtained by setting according to a method as shown in FIG. 2, and the method includes specifically the following steps.

Step 201: Collect a touch press coordinate and a touch uplift coordinate of each action in the touch click mode, obtain a range value of each action in the touch click mode according to the touch press coordinate and the touch uplift coordinate, and calculate an average range value of the action in the touch click mode.

Table 1 shows a specific manner for calculating the average range value of the action in the touch click mode.

TABLE 1

| Touch click times | 1 | 2 | 3 | 4 |
|---|---|---|---|---|
| Coordinates (press/uplift) | (1, 2)/(3, 6) | (9, 10)/(12, 13) | (0, 3)/(3, 6) | (22, 57)/(24, 60) |
| Average range value of touch click action | | (2*4 + 3*3 + 3*3 + 2*3)/4 = 8 | | |

In the table, a unit of the average range value of the action in the touch click mode is pixel.

Step 202: Collect a touch press coordinate and a touch uplift coordinate of each action in the touch slide mode, obtain a range value of each action in the touch slide mode according to the touch press coordinate and the touch uplift coordinate, and calculate an average range value of the action in the touch slide mode.

Table 2 shows a specific manner for calculating the average range value of the action in the touch slide mode.

TABLE 2

| Touch slide times | 1 | 2 | 3 | 4 |
|---|---|---|---|---|
| Coordinates (press/uplift) | (1, 2)/(3, 17) | (1, 3)/(3, 13) | (0, 3)/(2, 18) | (2, 2)/(4, 16) |
| Average range value of touch click action | | (2*15 + 2*10 + 2*15 + 2*14)/4 = 27 | | |

In the table, a unit of the average range value of the action in the touch slide mode is pixel.

Step 203: Set the range threshold for discriminating the touch click mode from the touch slide mode according to the average range value of the action in the touch click mode and the average range value of the action in the touch slide mode.

In this embodiment, the range threshold for discriminating the touch click mode from the touch slide mode may be obtained by averaging the touch click range and the touch sliderange. For example, the threshold may be (8+27)/2=17.5 pixels obtained according to the results in Tables 1 and 2.

For an individual, as the difference between a contact range with a touch screen in the touch click mode and a contact range with a touch screen in the touch slide mode is apparent, an obvious boundary value exists between the touch click mode and the touch slide mode, and the value is defined as the range threshold for discriminating the touch click mode from the touch slide mode.

In this embodiment, there are many conditions for triggering a collection, for example, a data collection instruction is generated for triggering a collection of coordinates by pressing a preset button by a user. Alternatively, a data collection instruction for triggering a collection of coordinates is generated when a Subscriber Identity Module (SIM) in a touch screen terminal finds a change of the user. The change of the user may be obtained by determining a change of a user name or a user Identifier (ID). Specifically, a change of a SIM card in a touch screen mobile phone may be found by the SIM.

Specifically, when receiving the collection instruction, a software interface is popped up on the touch screen, and the software interface prompts the user to sequentially conduct actions at different areas in the touch click mode, and then prompts the user to sequentially conduct actions in the touch slide mode at different interfaces.

Step 103: If the touch range value is greater than the range threshold, the touch action is in the touch slide mode, and if the touch range value is not greater than the range threshold, the touch action is in the touch click mode.

In the user touch operation mode adaptive method according to the embodiment of the present invention, whether the touch action is in the touch slide mode or the touch click mode is determined by comparing the touch range value of the touch action with the range threshold that is set according to the user operation habit for discriminating the touch click mode from the touch slide mode, so as to solve the problem of incorrect operation easily occurring in identification of the user touch operation mode due to different user habits.

In order to make the technical solution according to the embodiment of the present invention clearer to persons skilled in the art, the user touch operation mode adaptive method is described in detail through specific embodiments.

Figure 3:
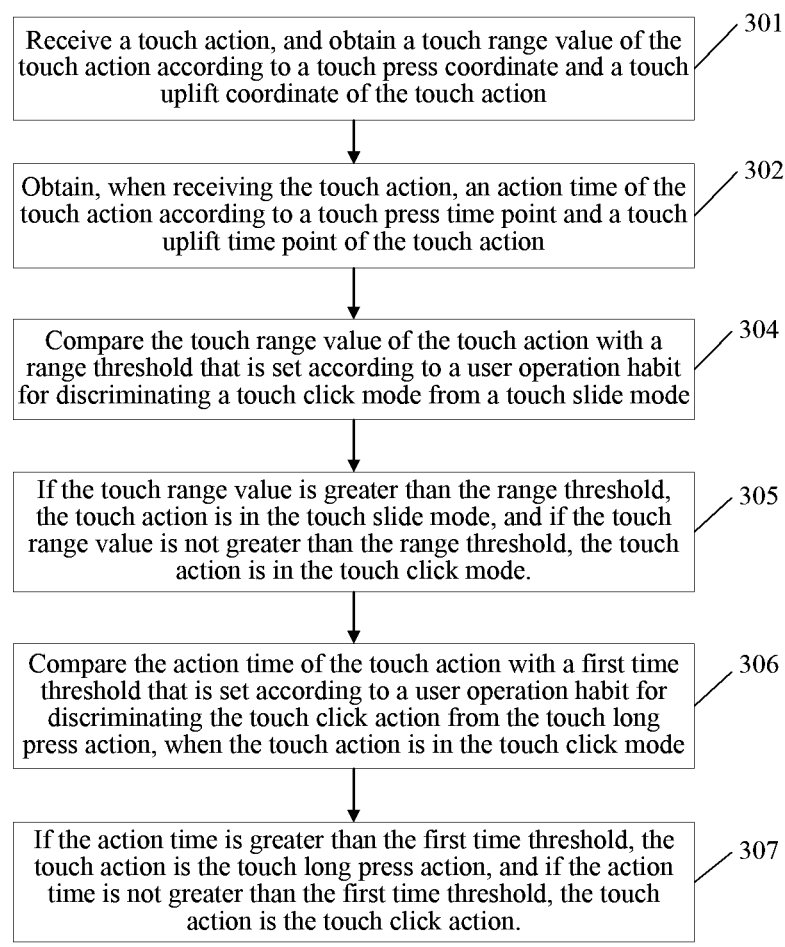
FIG. 3 is a first flow chart of a user touch operation mode adaptive method according to another embodiment of the present invention.

As shown in FIG. 3, a user touch operation mode adaptive method according to another embodiment of the present invention includes the following steps.

Step 301: Receive a touch action, and obtain a touch range value of the touch action according to a touch press coordinate and a touch uplift coordinate of the touch action.

Step 304: Compare the touch range value of the touch action with a range threshold that is set according to a user operation habit for discriminating a touch click mode from a touch slide mode. The range threshold that is set according to the user operation habit for discriminating the touch click mode from the touch slide mode may be obtained by setting according to the method as shown in FIG. 2, and is not further described herein again.

Step 305: If the touch range value is greater than the range threshold, the touch action is in the touch slide mode, and if the touch range value is not greater than the range threshold, the touch action is in the touch click mode.

In addition, in order to discriminate a touch click action from a touch long press action in the touch click mode, the method further includes the following steps.

Before step 304, the following step is performed.

Step 302: Obtain, when receiving the touch action, an action time of the touch action according to a touch press time point and a touch uplift time point of the touch action.

After step 305, the following step is performed.

Step 306: Compare the action time of the touch action with a first time threshold that is set according to a user operation habit for discriminating the touch click action from the touch long press action, when the touch action is in the touch click mode.

Figure 5:
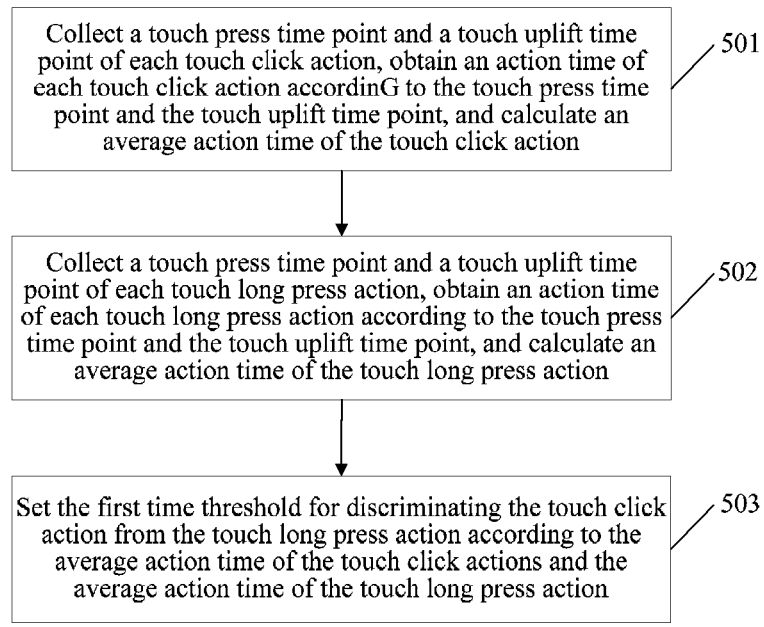
FIG. 5 shows a method of setting a first time threshold, according to a user operation habit, for discriminating a touch click action from a touch long press action in FIG. 3 and FIG. 4.

In this embodiment, the first time threshold that is set according to the user operation habit for discriminating the touch click action from the touch long press action may be obtained by setting according to a method as shown in FIG. 5, and the method specifically includes the following steps.

Step 501: Collect a touch press time point and a touch uplift time point of each touch click action, obtain an action time of each touch click action according to the touch press time point and the touch uplift time point, and calculate an average action time of the touch click action.

Step 502: Collect a touch press time point and a touch uplift time point of each touch long press action, obtain an action time of each touch long press action according to the touch press time point and the touch uplift time point, and calculate an average action time of the touch long press action.

Step 503: Set the first time threshold for discriminating the touch click action from the touch long press action according to the average action time of the touch click action and the average action time of the touch long press action.

Step 307: If the action time is greater than the first time threshold, the touch action is the touch long press action, and if the action time is not greater than the first time threshold, the touch action is the touch click action.

Figure 4:
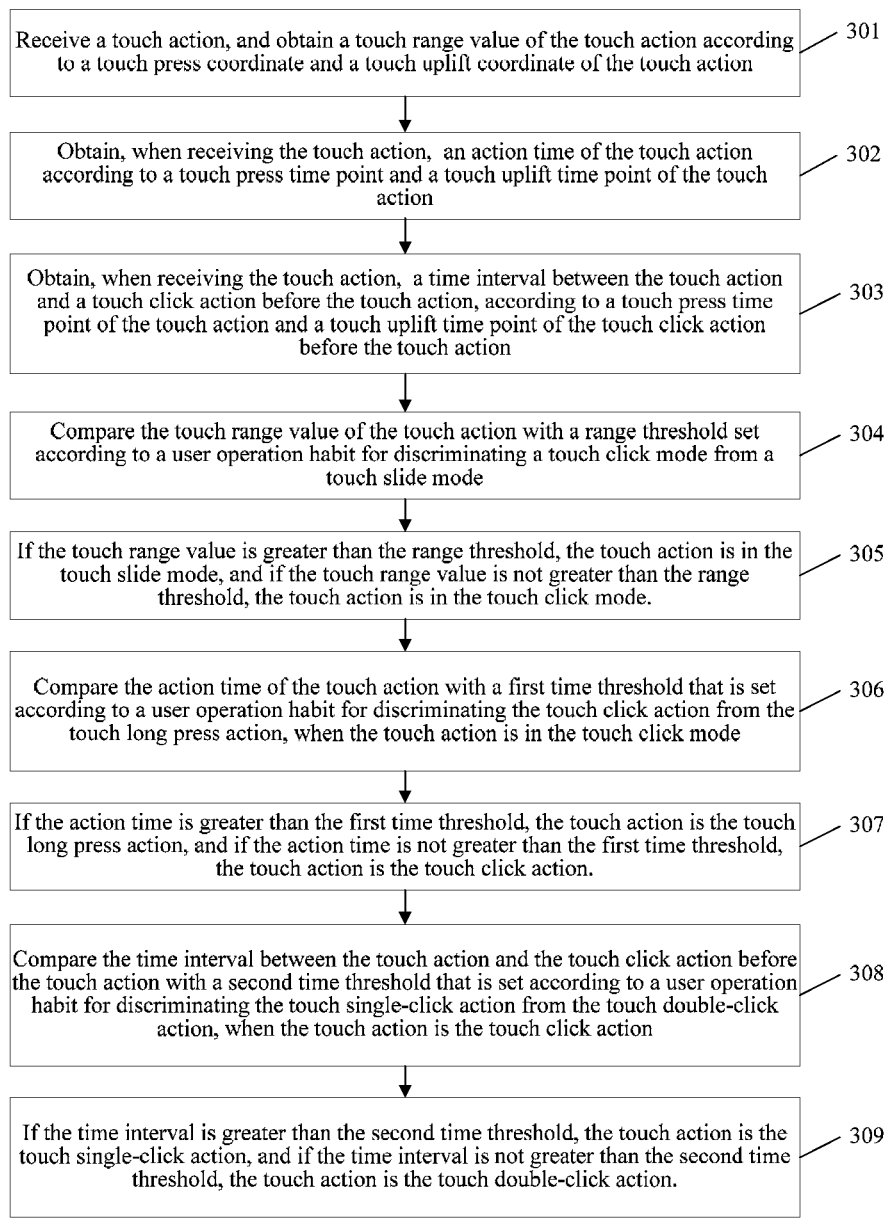
FIG. 4 is a second flow chart of a user touch operation mode adaptive method according to another embodiment of the present invention.

In addition, as shown in FIG. 4, in order to discriminate a touch single-click action from a touch double-click action in the touch click action, the method further includes the following steps.

Before step 304, the following step is performed.

Step 303: Obtain, when receiving the touch action, a time interval between the touch action and a touch click action before the touch action, according to a touch press time point of the touch action and a touch uplift time point of the touch click action before the touch action.

After step 307, the following step is performed.

Step 308: Compare the time interval between the touch action and the touch click action before the touch action with a second time threshold that is set according to a user operation habit for discriminating the touch single-click action from the touch double-click action, when the touch action is a touch click action.

Figure 6:
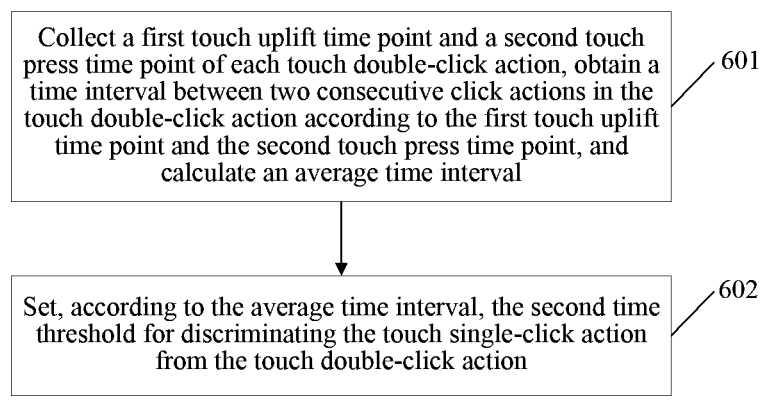
FIG. 6 shows a method for setting a second time threshold, according to a user operation habit, for discriminating a touch single-click action from a touch double-click action in FIG. 4.

In this embodiment, the second time threshold that is set according to the user operation habit for discriminating the touch single-click action from the touch double-click action may be obtained by setting according to a method as shown in FIG. 6, and the method includes specifically the following steps.

Step 601: Collect a first touch uplift time point and a second touch press time point of each touch double-click action, obtain a time interval between two consecutive click actions in the touch double-click action according to the first touch uplift time point and the second touch press time point, and calculate an average time interval.

Step 602: Set, according to the average time interval, the second time threshold for discriminating the touch single-click action from the touch double-click action.

Step 309: If the time interval is greater than the second time threshold, the touch action is the touch single-click action, and if the time interval is not greater than the second time threshold, the touch action is the touch double-click action.

In the user touch operation mode adaptive method according to the embodiment of the present invention, whether the touch action is in the touch slide mode or the touch click mode is determined by comparing the touch range value of the touch action with the range threshold that is set according to the user operation habit for discriminating the touch click mode from the touch slide mode, so as to solve the problem of incorrect operation easily occurring in identification of the user touch operation mode due to different user habits.

Figure 7:
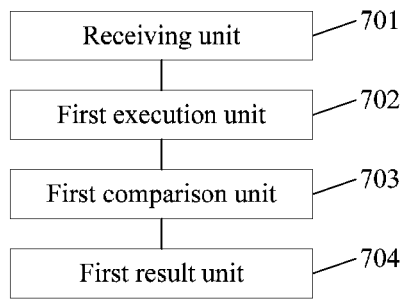
FIG. 7 is a first schematic structural diagram of a user touch operation mode adaptive device according to an embodiment of the present invention.

As shown in FIG. 7, a user touch operation mode adaptive device according to an embodiment of the present invention includes a receiving unit 701, a first execution unit 702, a first comparison unit 703, and a first result unit 704.

The receiving unit 701 is configured to receive a touch action. A specific implementation method may refer to the description of Step 101 as shown in FIG. 1, which is not described herein again.

The first execution unit 702 is configured to obtain a touch range value of the touch action according to a touch press coordinate and a touch uplift coordinate of the touch action that are received by the receiving unit. A specific implementation method may refer to the description of Step 101 as shown in FIG. 1, which is not described herein again.

The first comparison unit 703 is configured to compare the touch range value of the touch action obtained by the execution unit with a range threshold that is set according to a user operation habit for discriminating a touch click mode from a touch slide mode. A specific implementation method may refer to the description of Step 102 as shown in FIG. 1, which is not described herein again.

The first result unit 704 is configured to determine that the touch action is in the touch slide mode when the touch range value is greater than the range threshold, or determine that the touch action is in the touch click mode when the touch range value is not greater than the range threshold. A specific implementation method may refer to the description of Step 103 as shown in FIG. 1, which is not described herein again.

Figure 8:
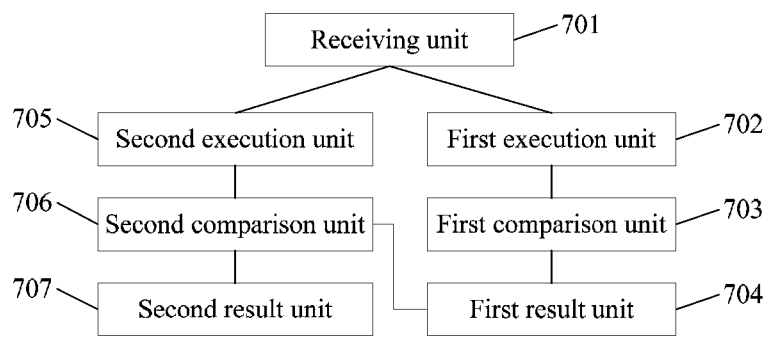
FIG. 8 is a second schematic structural diagram of a user touch operation mode adaptive device according to an embodiment of the present invention.

In addition, in order to discriminate a touch click action from a touch long press action in the touch click mode, as shown in FIG. 8, the device further includes a second execution unit 705, a second comparison unit 706, and a second result unit 707.

The second execution unit 705 is configured to obtain an action time of the touch action according to a touch press time point and a touch uplift time point of the touch action that are received by the receiving unit. A specific implementation method may refer to the description of Step 302 as shown in FIG. 3, which is not described herein again.

The second comparison unit 706 is configured to compare the action time of the touch action with a first time threshold that is set according to a user operation habit for discriminating the touch click action from the touch long press action, when the first result unit determines that the touch action is in the touch click mode. A specific implementation method may refer to the description of Step 306 as shown in FIG. 3, which is not described herein again.

The second result unit 707 is configured to determine that the touch action is the touch long press action when the action time is greater than the first time threshold, or determine that the touch action is the touch click action when the action time is not greater than the first time threshold. A specific implementation method may refer to the description of Step 307 as shown in FIG. 3, which is not described herein again.

Figure 9:
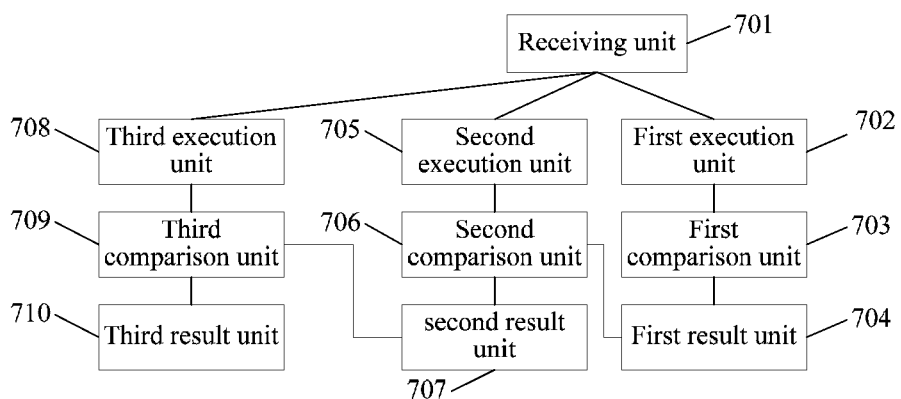
FIG. 9 is a third schematic structural diagram of a user touch operation mode adaptive device according to an embodiment of the present invention.

In addition, in order to discriminate a touch single-click action from a touch double-click action in the touch click action, as shown in FIG. 9, the device further includes a third execution unit 708, a third comparison unit 709, and a third result unit 710.

The third execution unit 708 is configured to obtain a time interval between the touch action and a touch click action before the touch action, according to a touch press time point of the touch action received by the receiving unit and a touch uplift time point of the touch click action before the touch action. A specific implementation method may refer to the description of step 303 as shown in FIG. 4, which is not described herein again.

The third comparison unit 709 is configured to compare the time interval between the touch action and the touch click action before the touch action with a second time threshold set according to a user operation habit for discriminating the touch single-click action from the touch double-click action, when the second result unit determines that the touch action is the touch click action. A specific implementation method may refer to the description of step 308 as shown in FIG. 4, which will not be described herein again.

The third result unit 710 is configured to determine that the touch action is the touch single-click action when the time interval is greater than the second time threshold, or determine that the touch action is the touch double-click action when the time interval is not greater than the second time threshold. A specific implementation method may refer to the description of step 309 as shown in FIG. 4, which will not be described herein again.

Figure 10:
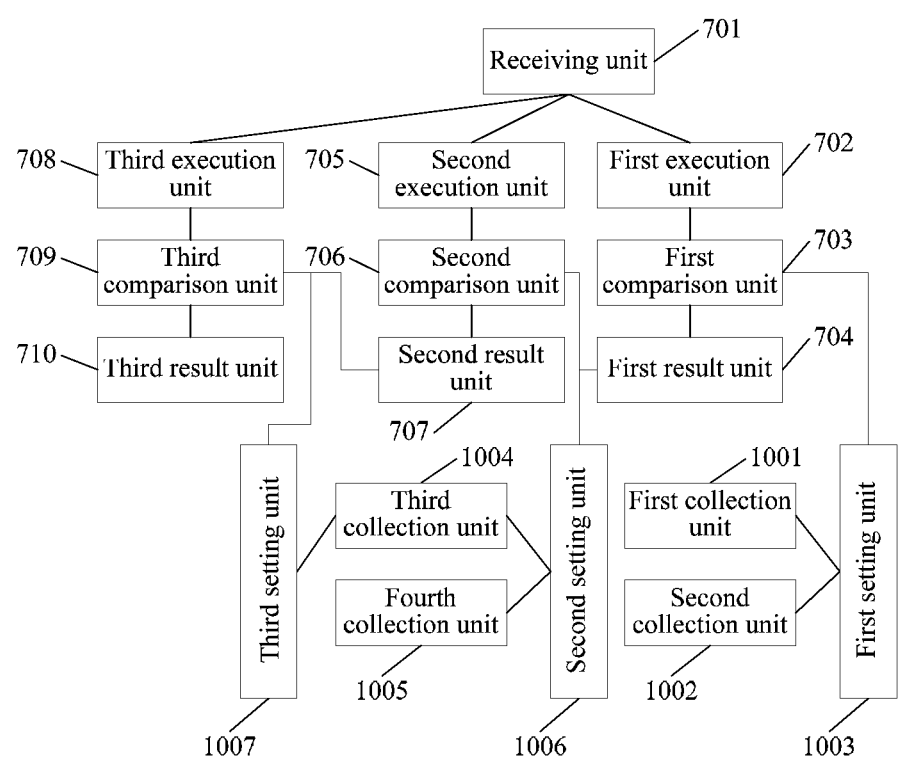
FIG. 10 is a fourth schematic structural diagram of a user touch operation mode adaptive device according to an embodiment of the present invention.

In addition, as shown in FIG. 10, the device further includes a first collection unit 1001, a second collection unit 1002, a first setting unit 1003, a third collection unit 1004, a fourth collection unit 1005, and a second setting unit 1006.

The first collection unit 1001 is configured to collect a touch press coordinate and a touch uplift coordinate of each action in the touch click mode, obtain a range value of each action in the touch click mode according to the touch press coordinate and the touch uplift coordinate, and calculate an average range value of the action in the touch click mode. A specific implementation method may refer to the description of Step 201 as shown in FIG. 2, which is not described herein again.

The second collection unit 1002 is configured to collect a touch press coordinate and a touch uplift coordinate of each action in the touch slide mode, obtain a range value of each action in the touch slide mode according to the touch press coordinate and the touch uplift coordinate, and calculate an average range value of the action in the touch slide mode. A specific implementation method may refer to the description of step 202 as shown in FIG. 2, which will not be described herein again.

The first setting unit 1003 is configured to set the range threshold for discriminating the touch click mode from the touch slide mode according to the average range value of the actions in the touch click mode obtained by the first collection unit and the average range value of the actions in the touch slide mode obtained by the second collection unit. A specific implementation method may refer to the description of step 203 as shown in FIG. 2, which will not be described herein again.

The third collection unit 1004 is configured to collect a touch press time point and a touch uplift time point of each touch click action, obtain an action time of each touch click action according to the touch press time point and the touch uplift time point, and calculate an average action time of the touch click action. A specific implementation method may refer to the description of Step 501 as shown in FIG. 5, which is not described herein again.

The fourth collection unit 1005 is configured to collect a touch press time point and a touch uplift time point of each touch long press action, obtain an action time of each touch long press action according to the touch press time point and the touch uplift time point, and calculate an average action time of the touch long press action. A specific implementation method may refer to the description of Step 502 as shown in FIG. 5, which is not described herein again.

The second setting unit 1006 is configured to set the first time threshold for discriminating the touch click action from the touch long press action according to the average action time of the touch click action obtained by the third collection unit and the average action time of the touch long press actions obtained by the fourth collection unit. A specific implementation method may refer to the description of Step 503 as shown in FIG. 5, which is not described herein again.

In addition, the third collection unit 1004 is further configured to:

collect a first touch uplift time point and a second touch press time point of each touch double-click action, obtain a time interval between two consecutive click actions in the touch double-click action according to the first touch uplift time point and the second touch press time point, and calculate an average time interval. A specific implementation method may refer to the description of Step 601 as shown in FIG. 6, which is not described herein again.

The device further includes a third setting unit 1007.

The third setting unit 1007 is configured to set the second time threshold for discriminating the touch single-click action from the touch double-click action according to the average time interval obtained by the third collection unit. A specific implementation method may refer to the description of Step 602 as shown in FIG. 6, which is not described herein again.

According to the user touch operation mode adaptive device according to the embodiment of the present invention, whether the touch action is in the touch slide mode or the touch click mode is determined by comparing the touch range value of the touch action with the range threshold that is set according to the user operation habit for discriminating the touch click mode from the touch slide mode, so as to solve the problem of incorrect identification of a user touch operation mode due to different user habits.

Figure 11:
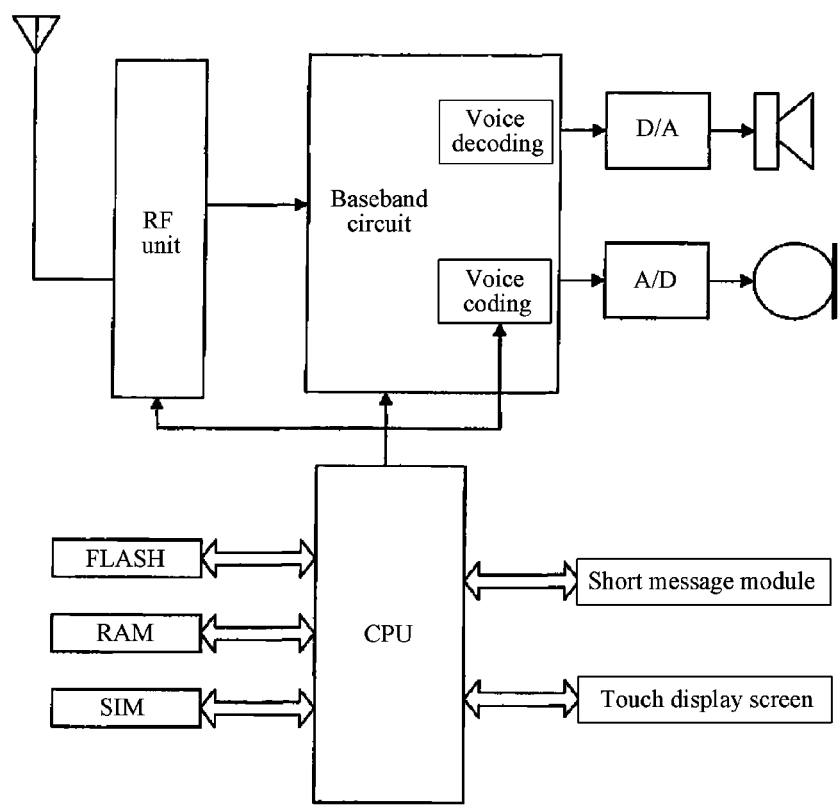
FIG. 11 is a schematic structural diagram of a touch screen terminal according to an embodiment of the present invention.

As shown in FIG. 11, a touch screen terminal according to an embodiment of the present invention mainly includes a Central Processing Unit (CPU), a Radio-frequency (RF) unit, and a baseband circuit. The RF unit and the baseband circuit are coupled to the CPU. In addition, a SIM card, a storage device (for example, FALSH and RAM), a short message module, and a touch display screen connected to the CPU are further included. A user touch operation mode adaptive device as shown in FIG. 7 to FIG. 10 is set in the CPU.

According to the touch screen terminal according to the embodiment of the present invention, whether the touch action is in the touch slide mode or the touch click mode is determined by comparing the touch range value of the touch action with the range threshold that is set according to the user operation habit for discriminating the touch click mode from the touch slide mode, so as to solve the problem of incorrect identification of a user touch operation mode due to different user habits.

The user touch operation mode adaptive method and device according to the embodiments of the present invention are applicable to a touch screen terminal.

Persons skilled in the art should understand that all or a part of the steps of the method according to the embodiments of the present invention may be implemented by a program instructing relevant hardware. The program may be stored in a computer readable storage medium, such as a ROM/RAM, a magnetic disk, or an optical disk.

The descriptions above are only specific embodiments of the present invention, but not intended to limit the protection scope of the present invention. Any modifications, equivalent replacements, or improvements easily made by persons skilled in the art in the technical scope of the present invention shall fall within the protection scope of the present invention as defined by the appended claims.

What is claimed is:

1. A user touch operation mode adaptive method, comprising:
    receiving a touch action;
    obtaining a touch range value of the touch action according to a touch press coordinate and a touch uplift coordinate of the touch action; and
    comparing the touch range value of the touch action with a range threshold that is set according to a user operation habit for discriminating a touch click mode from a touch slide mode, wherein if the touch range value is greater than the range threshold, the touch action is in the touch slide mode, and if the touch range value is not greater than the range threshold, the touch action is in the touch click mode,
    wherein the range threshold is set based on:
        collecting a touch press coordinate and a touch uplift coordinate of each action in the touch click mode, obtaining a range value of each action in the touch click mode according to the touch press coordinate and the touch uplift coordinate, and calculating an average range value of the action in the touch click mode,
        collecting a touch press coordinate and a touch uplift coordinate of each action in the touch slide mode, obtaining a range value of each action in the touch slide mode according to the touch press coordinate and the touch uplift coordinate, and calculating an average range value of the action in the touch slide mode, and
        setting the range threshold for discriminating the touch click mode from the touch slide mode according to the average range value of the actions in the touch click mode and the average range value of the actions in the touch slide mode.

2. The method according to claim 1, further comprising:
    obtaining, when receiving the touch action, an action time of the touch action according to a touch press time point and a touch uplift time point of the touch action; and
    comparing the action time of the touch action with a first time threshold that is set according to a user operation habit for discriminating a touch click action from a touch long press action, when the touch action is in the touch click mode,
    wherein if the action time is greater than the first time threshold, the touch action is the touch long press action, and if the action time is not greater than the first time threshold, the touch action is the touch click action.

3. The method according to claim 2, further comprising:
    obtaining, when receiving the touch action, a time interval between the touch action and a touch click action before the touch action, according to a touch press time point of the touch action and a touch uplift time point of the touch click action before the touch action; and
    comparing the time interval between the touch action and the touch click action before the touch action with a second time threshold that is set according to a user operation habit for discriminating a touch single-click action from a touch double-click action, when the touch action is the touch click action,
    wherein if the time interval is greater than the second time threshold, the touch action is the touch single-click action, and if the time interval is not greater than the second time threshold, the touch action is the touch double-click action.

4. The method according to claim 1, further comprising:
    collecting a touch press time point and a touch uplift time point of each touch click action, obtaining an action time of each touch click action according to the touch press time point and the touch uplift time point, and calculating an average action time of the touch click action; and
    collecting a touch press time point and a touch uplift time point of each touch long press action, obtaining an action time of each touch long press action according to the touch press time point and the touch uplift time point, and calculating an average action time of the touch long press action; and
    setting the first time threshold for discriminating the touch click action from the touch long press action according to the average action time of the touch click action and the average action time of the touch long press action.

5. The method according to claim 4, wherein when the touch click action is a touch double-click action, the collecting the touch press time point and the touch uplift time point of each touch click action comprises:
    collecting a first touch uplift time point and a second touch press time point of each touch double-click action, obtaining a time interval between two consecutive click actions in the touch double-click action according to the first touch uplift time point and the second touch press time point, and calculating an average time interval; and
    setting the second time threshold, according to the average time interval, for discriminating a touch single-click action from the touch double-click action.

6. A user touch operation mode adaptive device, comprising:
- a receiving unit, configured to receive a touch action;
- a first collection unit, configured to collect a touch press coordinate and a touch uplift coordinate of each action in a touch click mode, obtain a range value of each action in the touch click mode according to the touch cress coordinate and the touch uplift coordinate, and calculate an average range value of the action in the touch click mode;
- a second collection unit, configured to collect a touch press coordinate and a touch uplift coordinate of each action in a touch slide mode, obtain a range value of each action in the touch slide mode according to the touch cress coordinate and the touch uplift coordinate, and calculate an average range value of the action in the touch slide mode;
- a first setting unit, configured to set a range threshold for discriminating the touch click mode from the touch slide mode according to the average range value of the action in the touch click mode obtained by the first collection unit and the average range value of the action in the touch slide mode obtained by the second collection unit;
- a first execution unit, configured to obtain a touch range value of the touch action according to a touch press coordinate and a touch uplift coordinate of the touch action that are received by the receiving unit;
- a first comparison unit, configured to compare the touch range value of the touch action obtained by the first execution unit with the range threshold that is set according to a user operation habit for discriminating the touch click mode from the touch slide mode; and
- a first result unit, configured to determine that the touch action is in the touch slide mode when the touch range value is greater than the range threshold, or determine that the touch action is in the touch click mode when the touch range value is not greater than the range threshold.

7. The device according to claim 6, further comprising:
- a second execution unit, configured to obtain an action time of the touch action according to a touch press time point and a touch uplift time point of the touch action that are received by the receiving unit;
- a second comparison unit, configured to compare the action time of the touch action with a first time threshold that is set according to a user operation habit for discriminating a touch click action from a touch long press action, when the first result unit determines that the touch action is in the touch click mode; and
- a second result unit, configured to determine that the touch action is the touch long press action when the action time is greater than the first time threshold, or determine that the touch action is the touch click action when the action time is not greater than the first time threshold.

8. The device according to claim 7, further comprising:
- a third execution unit, configured to obtain a time interval between the touch action and a touch click action before the touch action, according to a touch press time point of the touch action received by the receiving unit and a touch uplift time point of the touch click action before the touch action;
- a third comparison unit, configured to compare the time interval between the touch action and the touch click action before the touch action with a second time threshold that is set according to a user operation habit for discriminating a touch single-click action from a touch double-click action, when the second result unit determines that the touch action is the touch click action; and
- a third result unit, configured to determine that the touch action is the touch single-click action when the time interval is greater than the second time threshold, or determine that the touch action is the touch double-click action when the time interval is not greater than the second time threshold.

9. The device according to claim 6, further comprising:
- a third collection unit, configured to collect a touch press time point and a touch uplift time point of each touch click action, obtain an action time of each touch click action according to the touch press time point and the touch uplift time point, and calculate an average action time of the touch click action;
- a fourth collection unit, configured to collect a touch press time point and a touch uplift time point of each touch long press action, obtain an action time of each touch long press action according to the touch press time point and the touch uplift time point, and calculate an average action time of the touch long press action; and
- a second setting unit, configured to set the first time threshold for discriminating the touch click action from the touch long press action according to the average action time of the touch click actions obtained by the third collection unit and the average action time of the touch long press action obtained by the fourth collection unit.

10. The device according to claim 9, wherein when the touch click action is the touch double-click action, the third collection unit is further configured to:
- collect a first touch uplift time point and a second touch press time point of each touch double-click action, obtain a time interval between two consecutive click actions in the touch double-click action according to the first touch uplift time point and the second touch press time point, and calculate an average time interval; and the device further comprises:
- a third setting unit, configured to set the second time threshold, according to the average time interval obtained by the third collection unit, for discriminating the touch single-click action from the touch double-click action.

11. A touch screen terminal, comprising a user touch operation mode adaptive device, the user touch operation mode adaptive device comprising:
- a receiving unit, configured to receive a touch action;
- a first collection unit, configured to collect a touch press coordinate and a touch uplift coordinate of each action in a touch click mode, obtain a range value of each action in the touch click mode according to the touch cress coordinate and the touch uplift coordinate, and calculate an average range value of the action in the touch click mode;
- a second collection unit, configured to collect a touch press coordinate and a touch uplift coordinate of each action in a touch slide mode, obtain a range value of each action in the touch slide mode according to the touch cress coordinate and the touch uplift coordinate, and calculate an average range value of the action in the touch slide mode;
- a first setting unit, set a range threshold for discriminating the touch click mode from the touch slide mode according to the average range value of the action in the touch click mode obtained by the first collection unit and the average range value of the action in the touch slide mode obtained by the second collection unit;
- a first execution unit, configured to obtain a touch range value of the touch action according to a touch press coordinate and a touch uplift coordinate of the touch action that are received by the receiving unit;

a first comparison unit, configured to compare the touch range value of the touch action obtained by the first execution unit with the range threshold that is set according to a user operation habit for discriminating the touch click mode from the touch slide mode;

a first result unit, configured to determine that the touch action is in the touch slide mode when the touch range value is greater than the range threshold, or determine that the touch action is in the touch click mode when the touch range value is not greater than the range threshold.

12. A touch screen terminal, comprising:
a touch display;
memory;
one or more processors; and
one or more modules stored in the memory and configured for execution by the one or more processors, the one or more modules including instructions:
  to receive a touch action, and obtain a touch range value of the touch action according to a touch press coordinate and a touch uplift coordinate of the touch action;
  to collect a touch press coordinate and a touch uplift coordinate of each action in a touch click mode, obtain a range value of each action in the touch click mode according to the touch press coordinate and the touch uplift coordinate, and calculate an average range value of the action in the touch click mode;
  to collect a touch press coordinate and a touch uplift coordinate of each action in a touch slide mode, obtain a range value of each action in the touch slide mode according to the touch press coordinate and the touch uplift coordinate, and calculate an average range value of the action in the touch slide mode;
  to set a range threshold for discriminating the touch click mode from the touch slide mode according to the average range value of the actions in the touch click mode and the average range value of the actions in the touch slide mode; and
  to compare the touch range value of the touch action with the range threshold that is set according to a user operation habit for discriminating the touch click mode from the touch slide mode, wherein if the touch range value is greater than the range threshold, the touch action is in the touch slide mode, and if the touch range value is not greater than the range threshold, the touch action is in the touch click mode.

* * * * *

UNITED STATES PATENT AND TRADEMARK OFFICE
CERTIFICATE OF CORRECTION

PATENT NO. : 9,052,761 B2  Page 1 of 1
APPLICATION NO. : 13/729763
DATED : June 9, 2015
INVENTOR(S) : Yingjun Zhou It is certified that error appears in the above-identified patent and that said Letters Patent is hereby corrected as shown below:

Claims

Column 11, line 7, Claim 6, "cress" should read -- press --.

Column 11, line 14, Claim 6, "cress" should read -- press --.

Signed and Sealed this
Eighth Day of December, 2015

Michelle K. Lee
*Director of the United States Patent and Trademark Office*